(12) United States Patent
Albeshri et al.

(10) Patent No.: US 11,741,359 B2
(45) Date of Patent: Aug. 29, 2023

(54) SYSTEMS AND PROCEDURES TO FORECAST WELL PRODUCTION PERFORMANCE FOR HORIZONTAL WELLS UTILIZING ARTIFICIAL NEURAL NETWORKS

(71) Applicant: Saudi Arabian Oil Company, Dhahran (SA)

(72) Inventors: Reem M. Albeshri, Dhahran (SA); Yusuf Pamukcu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 369 days.

(21) Appl. No.: 16/887,752

(22) Filed: May 29, 2020

(65) Prior Publication Data

US 2021/0374521 A1   Dec. 2, 2021

(51) Int. Cl.
| | | |
|---|---|---|
| *G06N 3/08* | (2023.01) | |
| *G06F 30/28* | (2020.01) | |
| *G06F 30/27* | (2020.01) | |
| *G01V 99/00* | (2009.01) | |
| *G06F 113/08* | (2020.01) | |
| *G06F 111/10* | (2020.01) | |

(52) U.S. Cl.
CPC ............ *G06N 3/08* (2013.01); *G01V 99/005* (2013.01); *G06F 30/27* (2020.01); *G06F 30/28* (2020.01); *G06F 2111/10* (2020.01); *G06F 2113/08* (2020.01)

(58) Field of Classification Search
CPC ........ G06N 3/08; G01V 99/005; G06F 30/27; G06F 30/28; G06F 2111/10; G06F 2113/08; E21B 43/30; E21B 2200/20; E21B 2200/22
See application file for complete search history.

(56) References Cited

U.S. PATENT DOCUMENTS

| | | | |
|---|---|---|---|
| 5,862,513 | A | 1/1999 | Mezzatesta et al. |
| 7,680,617 | B2 | 3/2010 | Mazrooee et al. |
| 8,046,314 | B2 | 10/2011 | Graf et al. |

(Continued)

FOREIGN PATENT DOCUMENTS

| | | |
|---|---|---|
| KR | 2019-0114450 A | 10/2019 |
| WO | WO-2002050571 A2 | 6/2002 |

(Continued)

OTHER PUBLICATIONS

He, Z. et al., Neural-Network Approach to Predict Well Performance Using Available Field Data, Summary, Soc. of Petro. Engineers (2001).

(Continued)

*Primary Examiner* — Steven W Crabb
(74) *Attorney, Agent, or Firm* — Osha Bergman Watanabe & Burton LLP (57) ABSTRACT

An artificial neural network (ANN) system for predicting and optimizing well placement, productivities, and development includes: an ANN; computer hardware for building, training, using, and storing the ANN; and computer software for programming and processing the ANN. The ANN includes an input layer of input nodes representing at least one input parameter, an output layer of output nodes representing at least one output parameter, and at least one hidden layer operatively coupling the input layer to the output layer.

16 Claims, 5 Drawing Sheets

(56) References Cited

U.S. PATENT DOCUMENTS

| | | |
|---|---|---|
| 9,022,140 B2 | 5/2015 | Marx et al. |
| 9,960,637 B2 | 5/2018 | Sanders et al. |
| 2018/0240021 A1 | 8/2018 | Al-Harbi et al. |
| 2019/0169986 A1 | 6/2019 | Storm, Jr. et al. |
| 2019/0284910 A1 | 9/2019 | Amr et al. |
| 2020/0160173 A1* | 5/2020 | Pandey .................. G06N 3/08 |
| 2021/0010351 A1* | 1/2021 | Sun ...................... G06N 3/0454 |
| 2021/0089897 A1* | 3/2021 | Zhang ................. G01V 99/005 |

FOREIGN PATENT DOCUMENTS

| | | |
|---|---|---|
| WO | WO-2002068796 A1 | 9/2002 |
| WO | WO-2008008745 A2 | 1/2008 |
| WO | WO-2017171576 A1 | 10/2017 |
| WO | WO-2019125440 A1 | 6/2019 |
| WO | WO-2021/240228 A1 | 12/2021 |

OTHER PUBLICATIONS

Tabatabaei, M. and Ghalambor, A., A New Method to Predict Performance of Horizontal and Multilateral Wells, Summary, Soc. of Petro. Engineers (2011).

Chu, M. et al., Determination of an infill well placement using a data-driven multi-modal convolutional neural network, Jrnl. Petro. Sci. Engin., 195:17 (2020).

International Search Report for PCT/IB2020/057455, 5 pages (dated Feb. 2, 2021).

Johnson, V. M. and Rogers, L. L., Applying soft computing methods to improve the computational tractability of a subsurface simulation-optimization problem, Jrnl. Petro. Sci. Engin., 29(3-4):153-175 (2001).

Written Opinion for PCT/IB2020/057455, 9 pages (dated Feb. 2, 2021).

* cited by examiner

SYSTEMS AND PROCEDURES TO FORECAST WELL PRODUCTION PERFORMANCE FOR HORIZONTAL WELLS UTILIZING ARTIFICIAL NEURAL NETWORKS

FIELD

The subject matter described herein relates to systems and methods to forecast and optimize well placement and production performance of a reservoir.

BACKGROUND

Well placement is a key decision in the oilfield development process. To plan several wells, hundreds of placement options must be considered in order to optimize hydrocarbon production based on a complex combination of geological, petrophysical, flow regimen, and economical parameters that are hard to grasp intuitively. Hence, intuitive judgement from professional engineers is generally considered ineffective at predicting the best well placements or configurations.

Computational approaches have been developed but require understanding and confirming the impact of different engineering and geological parameters by a number of reservoir simulation iterations. Reservoir performance may also be influenced by nonlinearly-correlated parameters, which may evolve with time adding to the computational complexity. In this context, numerical reservoir simulation has become a standard tool for decision-making purposes in the oil and gas industry. However, numerical reservoir simulations require extensive time and computational cost.

SUMMARY

The present disclosed embodiments include systems and methods for predicting well placement and production performance using artificial neural networks.

In one aspect, the present invention is directed to an artificial neural network (ANN) system for predicting and optimizing well placement, productivities, and development including: an ANN; computer hardware for building, training, using, and storing the ANN; and computer software for programming and processing the ANN. The ANN includes an input layer of input nodes representing at least one input parameter, an output layer of output nodes representing at least one output parameter, and at least one hidden layer operatively coupling the input layer to the output layer.

In some embodiments, the at least one output parameter includes at least one of a cumulative production of a reservoir and possible well locations for drilling.

In some embodiments, the at least one input parameter includes at least one potential well location.

In some embodiments, the at least one input parameter includes at least one reservoir property.

In some embodiments, the at least one reservoir property includes at least one of an average porosity, an average reservoir permeability, an average reservoir thickness, an initial reservoir pressure, a size of a field, an average oil saturation, an average water saturation, an average pore volume, an initial oil in place, a rock compressibility, and well trajectories.

In some embodiments, the computer hardware includes a memory device.

In some embodiments, the computer hardware includes at least one of a graphics processing unit (GPU), a tensor processing unit (TPU), a field-programmable gate array (FPGA), and an application-specific integrated circuit (ASIC).

In some embodiments, the computer software includes an operating system and a programming language.

In some embodiments, the programming language includes at least one of Lisp, Smalltalk, Perl, Python, JavaScript, Ruby, C, C++, C #, Java, Haskell, ML, MATLAB, Wolfram Language, VB, VBScript, VB.NET, R, PHP, and MATLAB.

In some embodiments, at least one well is drilled based on an output from the ANN. The at least one well includes a horizontal well.

In some embodiments, at least one well is drilled based on an output from the ANN. The at least one well includes a non-horizontal well.

In some embodiments, the ANN includes a correlation that describes fluid flow in at least one porous media of the reservoir. The correlation is linear.

In some embodiments, the ANN includes a correlation that describes fluid flow in at least one porous media of the reservoir. The correlation is non-linear.

In another aspect, the present invention is directed to a method of training an artificial neural network (ANN) including: importing at least one reservoir property into the ANN; training the ANN using the at least one reservoir property; generating output data for training and testing the ANN; comparing the output data with an output from a numerical reservoir simulation; repeating at least one of the previous steps; and generating the ANN with an accuracy above a predefined threshold.

In some embodiments, the at least one reservoir property is generated by running numerical reservoir simulations.

In some embodiments, running numerical reservoir simulations includes: importing input parameters; running one or more scenarios through numerical reservoir simulations; and generating outputs.

In some embodiments, training the ANN includes establishing a weight of a node in the ANN.

In some embodiments, the predefined threshold is at least about 80% accuracy when compared with an output from a numerical reservoir simulation.

In another aspect, the present invention is directed to a method of using an artificial neural network (ANN) including: generating input data; running the ANN using the input data; generating output data; and drilling at least one well based on the output data.

In some embodiments, the method includes predicting well production performance and predicting well placement.

In some embodiments, running the ANN using the input data further includes running numerical reservoir simulations.

Throughout the description, where systems are described as having, including, or comprising specific components, or where methods are described as having, including, or comprising specific steps, it is contemplated that, additionally, there are systems of the present invention that consist essentially of, or consist of, the recited components, and that there are methods according to the present invention that consist essentially of, or consist of, the recited processing steps.

It should be understood that the order of steps or order for performing certain actions is immaterial as long as the invention remains operable. Moreover, two or more steps or actions may be conducted simultaneously.

The following description is for illustration and exemplification of the disclosure only, and is not intended to limit the invention to the specific embodiments described.

The mention herein of any publication, for example, in the Background section, is not an admission that the publication serves as prior art with respect to any of the present claims. The Background section is presented for purposes of clarity and is not meant as a description of prior art with respect to any claim.

BRIEF DESCRIPTION OF THE DRAWING

A full and enabling disclosure of the present disclosed embodiments, including the best mode thereof, directed to one of ordinary skill in the art, is set forth in the specification, which makes reference to the appended figures, in which.

DESCRIPTION OF CERTAIN ASPECTS OF THE INVENTION

Reference will now be made in detail to the present disclosed embodiments, one or more examples of which are illustrated in the accompanying drawings. The detailed description uses numerical and/or letter designations to refer to features in the drawings. Like or similar designations in the drawings and description have been used to refer to like or similar parts of the present embodiments.

As noted herein, it is difficult for an engineer to use intuitive engineering judgement to find the optimal well location(s). Reservoir forecasting therefore tends to be time consuming and expensive given its heavy computational needs. Hundreds of scenarios and/or simulations are often required, in particular for large fields.

The present disclosed embodiments include improved systems and methods for predicting and optimizing well placement, productivities, and development using an ANN. The improved systems and methods may include a process to import and integrate well locations and reservoir properties for building, testing, and/or using the ANN. In some embodiments of the process, the well locations imported and/or integrated may be from at least one existing well for forcasting and/or optimizing placement for additional wells in a reservoir or a field. In some embodiments of the process, the well location(s) imported and/or integrated may be from at least a reservoir or a field for forcasting and/or optimizing placement for well location(s) from other reseavoirs or fields. In some embodiments, the systems and methods make it possible to test every possible location quickly as they do not require extensive computation like numerical modeling. Instead of running multiple scenarios, the systems and methods of the present disclosed embodiments simply go through one step which provides all possible well locations at once, and the ANN may generate a forecast in a few minutes which is significantly quicker than methods that rely exclusively on numerical reservoir simulations, where it can take several hours to generate a forecast. In some embodiments, numerical simulations are used only to train the ANN, but not when running the trained ANN. The improved systems and methods may assist engineers in estimating and/or finding the best locations to place and/or drill a well (that is, locations where a well should be drilled) and make an efficient development plan that yields maximum well productivities (for example, highest oil production) and recovery factors (RF) (that is, the proportion of the hydrocarbon that can be recovered). A recoverable oil or gas in a reservoir (that is, the recoverable oil or gas in place) may be represented by the product of RF and original hydrocarbons in place (OHIP). As such, engineers may select the best well with the best production performance and compare the results with numerical reservoir simulations.

Figure 1:
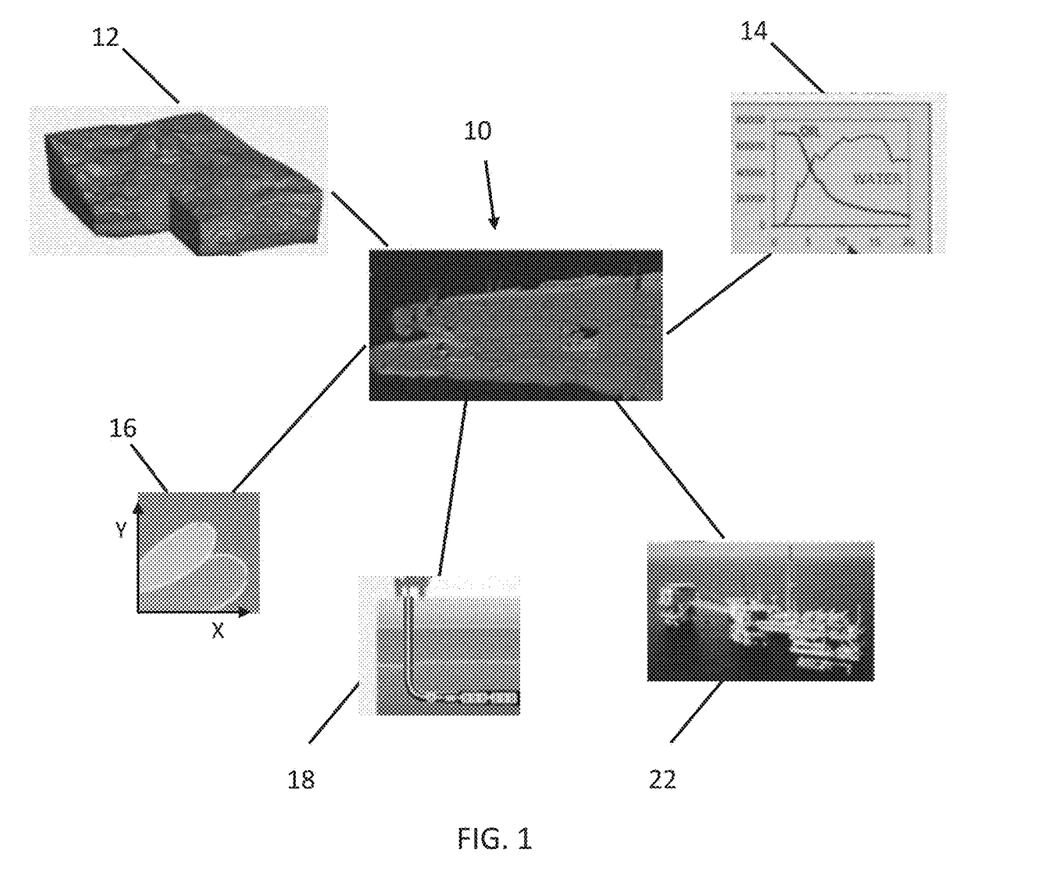
FIG. 1 illustrates an exemplary numerical reservoir simulation.

FIG. 1 illustrates an exemplary numerical reservoir simulation 10. The numerical reservoir simulation 10 may be constructed from a geological model 12 to represent a real or actual reservoir in a physical oil or gas field. In some embodiments, the numerical reservoir simulation 10 may include at least one correlation that describes fluid flow in porous media. The at least one correlation (linear and/or non-linear) may be linearized at the partial differential correlation level or at the discretized level to obtain a linear system of correlations. The numerical reservoir simulation 10 may be run by one or more numerical simulators (not shown) to solve the correlations using initial conditions (for example, contour or heterogeneity of the actual reservoir) to mimic the flow dynamics or properties of the actual reservoir (for example, a porous and permeable subsurface reservoir), the physical characteristics 16 (for example, fluid properties) for producing a wellbore 18, and the productivity 14 of reservoir fluids using surface facilities 22. The solutions may include time-dependent characteristics (for example, pressure, fluid saturation, composition, and temperature) that represent the performance of the reservoir in both time and space domains.

Figure 2:
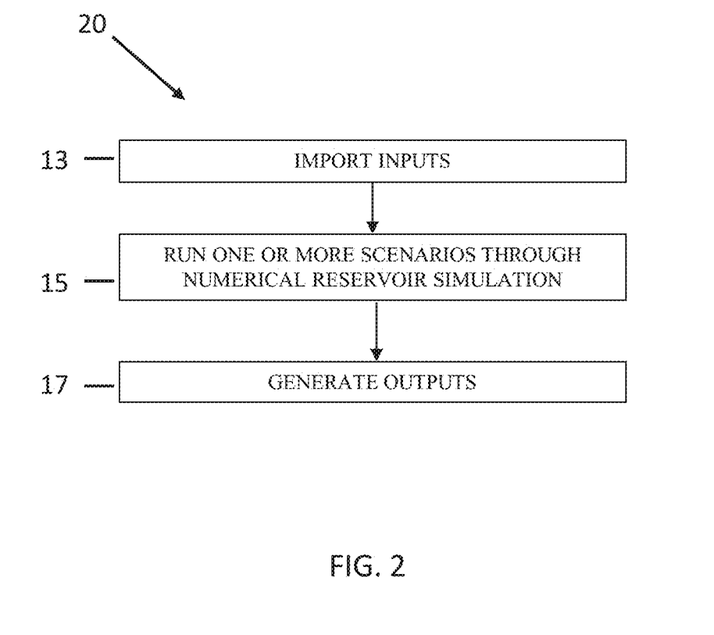
FIG. 2 illustrates an exemplary method of using numerical reservoir simulations, according to aspects of the present embodiments.

FIG. 2 illustrates an exemplary method 20 of using numerical reservoir simulations, according to aspects of the present embodiments. The exemplary method 20 may include a typical workflow including importing input parameters 13 (for example, choosing multiple random locations) for the numerical reservoir simulations, running a plurality of scenarios 15 using numerical reservoir simulations, and generating output data 17 that predict or forecast the well production performance.

Figure 3:
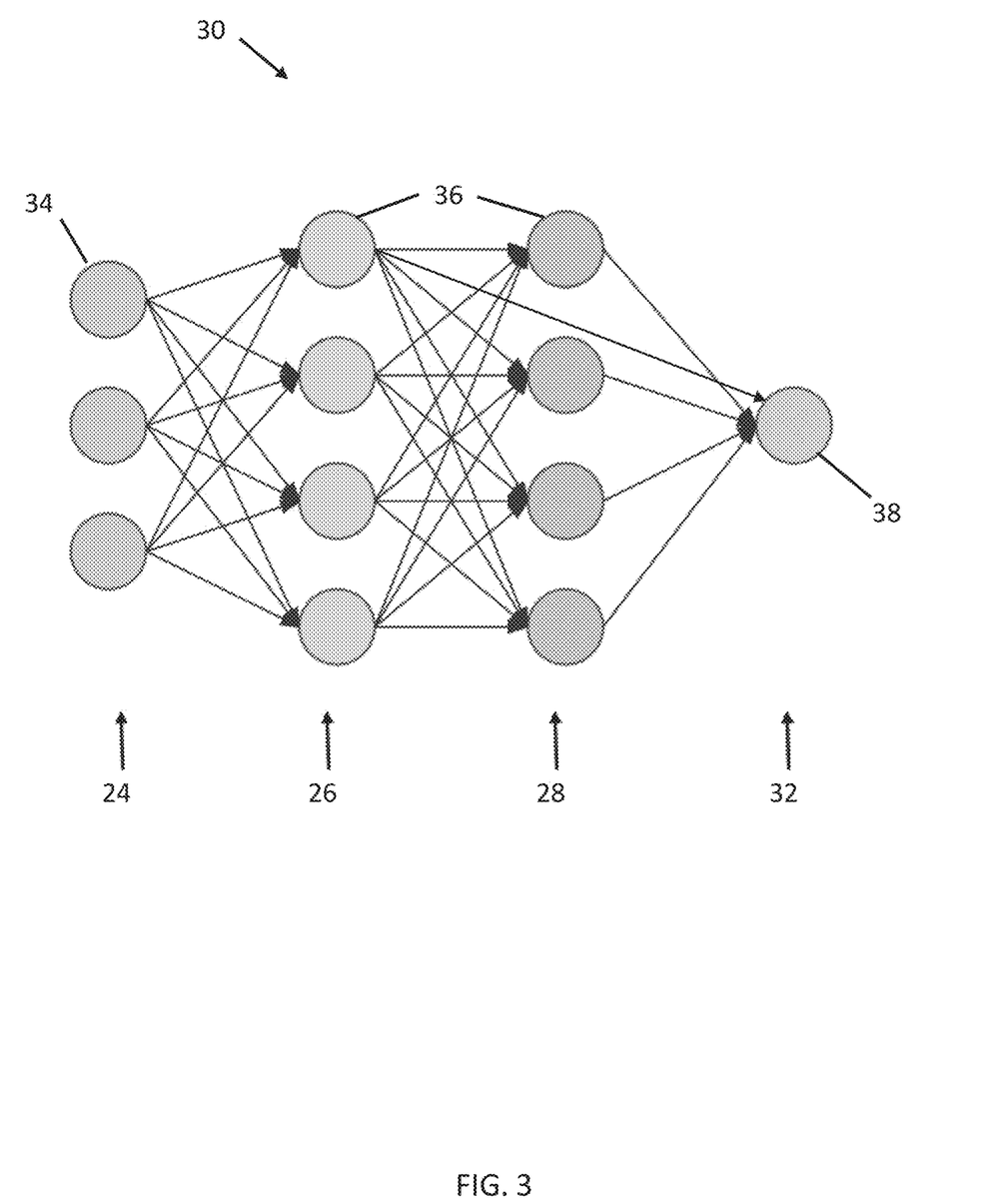
FIG. 3 illustrates an embodiment of the architecture of an artificial neural network (ANN), according to aspects of the present embodiments.

FIG. 3 illustrates an embodiment of the architecture of an ANN 30, according to aspects of the present embodiments. The ANN 30 may include at least one multi-layer fully-connected neural network including an input layer 24, an output layer 32, and at least one hidden layer (for example, a first hidden layer 26 and/or a second hidden layer 28) operatively coupling the input layer 24 to the output layer 32. In some embodiments, there may be more than two hidden layers (that is, more hidden layers beyond the two hidden layers 26, 28). Each layer of the layers 24, 26, 28, and 32 may include at least one computational unit (that is, a node). In some embodiments, each node 34 or 36 may include or be represented by a processing unit stored in one or more memory devices. From the input layer 24 to the output layer 32, every node in each previous layer (for example, an input node 34 in the input layer 24) may be connected to every node in the next layer(s) (for example, a hidden node 36 in the first hidden layer 26) as an input with a particular weight that represents the strength of the connection between the two nodes 34 and 36. The ANN 30 may be trained by establishing or learning the particular weight of each node 34 or 36 iteratively. Each node in the next layer(s) (for example, a hidden node 36) may take a weighted sum of its inputs from the nodes in the previous layer (for example, the input nodes 34), and pass it through a function (for example, a non-linear function) to produce its output, which becomes an input to a node in the layer(s) after or following the next layer(s). By performing such procedure for all the nodes, the final output(s) in the output layer 32 (for example, the value of an output node 38) may be calculated and generated.

Referring still to FIG. 3, the input layer 24 may include one or more input nodes 34, each input node 34 representing an input parameter. The input parameters may include the well locations in Cartesian (x,y,z) coordinates and/or reservoir properties such as average porosity, average reservoir permeability, average reservoir thickness, initial reservoir pressure, size (for example, area) of an oil field, average oil saturation, average water saturation, average pore volume, initial oil in place, rock compressibility, and well trajectories (for example, azimuth or length). The output layer 32 may include at least one output node 38, each output node representing an output parameter. The output parameters may include possible well locations for drilling, cumulative production of the reservoir, and/or other data of production performance of the well locations or the reservoir. The value of the output parameter(s) may be obtained after the ANN 30 is built and trained to achieve an accuracy above a predefined threshold (for example, at least 80% accuracy when compared with an output from a numerical reservoir simulation), and may thus become ready for use. The accuracy (for example, an accuracy of 80%) may be based on an R-squared value with R^2=0.8 corresponding to 80%. For example, the closeness with which the data from the ANN 30 matches the numerical reservoir simulation is defined as an 80% when the R-squared valve from the resulting curve fit of the ANN 30 data as a function of the numerical reservoir simulation is equal to 0.8. In other embodiments, an accuracy of at least 80% means that at least 80% of the output predictions from the ANN 30 match the numerical simulation within a predetermined tolerance or uncertainty threshold. The at least one hidden layer 26 or 28 may include at least one hidden node 36 to perform computations on the weighted inputs and produce a net input, which is then applied with activation functions to produce the final output(s). Each of the hidden nodes 36 may include a temporary parameter that is constructed by the ANN 30 to correlate the input parameter(s) to the output parameter(s).

Referring still to FIG. 3, the ANN 30 may be programmed via at least one computer hardware component (for example, a memory device, a central processing unit (CPU), a graphics processing unit (GPU), a tensor processing unit (TPU), a field-programmable gate array (FPGA), and an application-specific integrated circuit (ASIC), and other suitable devices) using a programming language or program (for example, Lisp, Smalltalk, Perl, Python, JavaScript, Ruby, C, C++, C #, Java, Haskell, ML, MATLAB, Wolfram Language, VB, VB Script, VB.NET, R, PHP, MATLAB, and other suitable programming languages), and processed in an operating system (for example, LINUX, unix, DOS, Windows, and other operating systems) using a computing device (for example, a desktop computer, a smart phone, a tablet, a laptop, and other suitable devices). The memory devices may include processors for building, training, and using the ANN 30. In some embodiments, the ANN 30 may include a single input and/or output parameter while in other embodiments, the ANN 30 may include multiple input and/or output parameters. In some embodiments, the ANN 30 may be trained for horizontal wells while in other embodiments, the ANN 30 may be trained for non-horizontal wells (for example, vertical wells). Once the training is complete, the ANN 30 may be run through each layer, from the input layer 24 to the output layer 32, to provide output predictions with an accuracy above a predefined threshold. The embodiments of the predictions may include how much oil a well may produce if drilled in specified locations, or every possible location that can be drilled in the oil and/or gas field. In some embodiments, the ANN 30 may be tested to compare the output data with an output from at least one numerical reservoir simulation. For example, if the output data from the ANN 30 predicts that at least one well location will have the highest production performance (for example, the best cumulative production) among well locations that are tested, the output data from the ANN 30 may be compared with the output data from at least one numerical reservoir simulation for determining whether or not to drill in the one or more well locations. For example, in the case of cumulative oil production, the accuracy of the forecast from the ANN 30 showed a good agreement (at or over about 80% accuracy when compared with an output from a numerical reservoir simulation) compared with an output from numerical reservoir simulation(s).

Figures 4, 5:
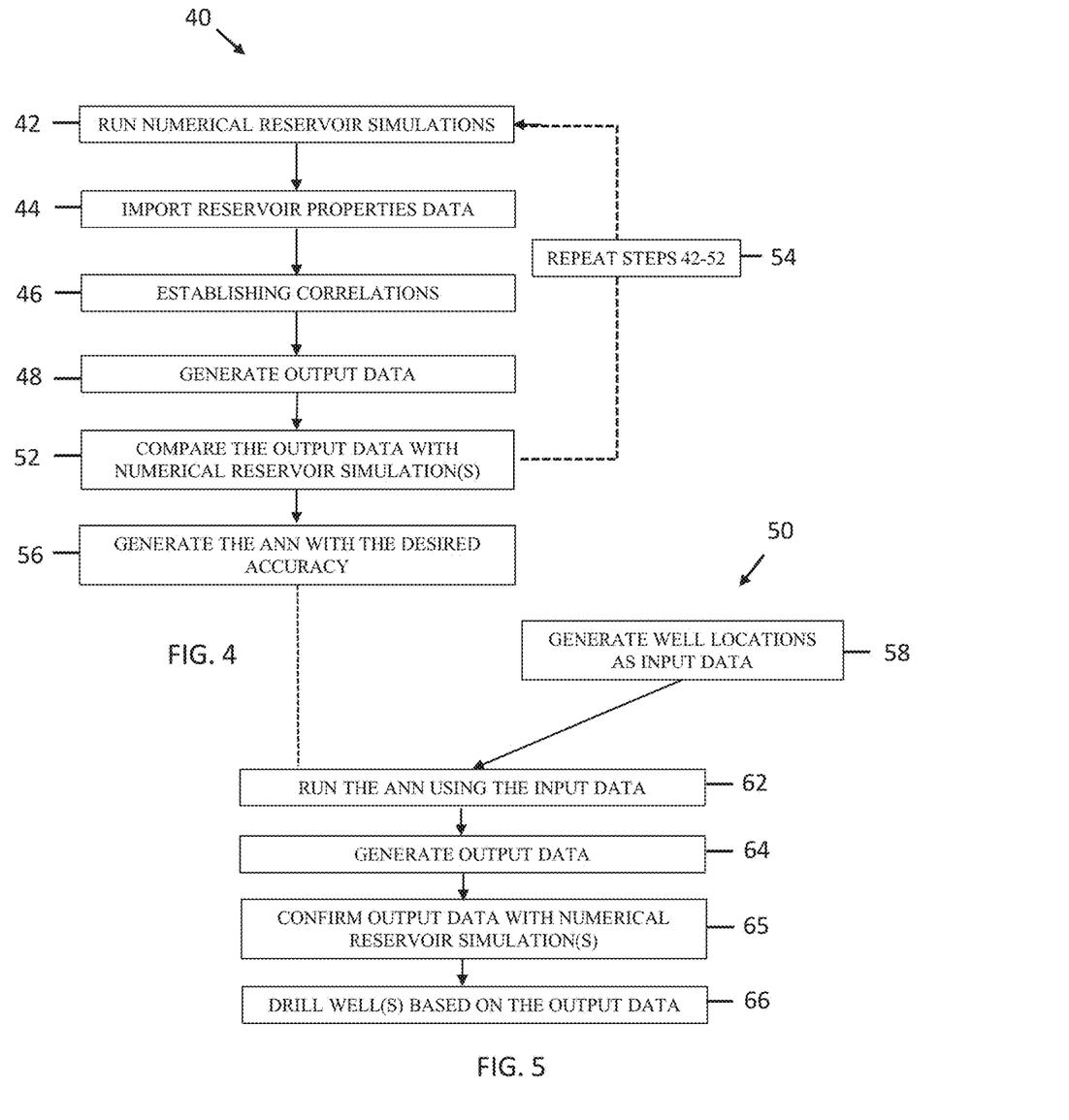
FIG. 4 illustrates methods of training an ANN, according to aspects of the present embodiments.
FIG. 5 illustrates methods of using an ANN, according to aspects of the present embodiments.

FIG. 4 illustrates methods 40 of training an ANN 30, according to aspects of the present embodiments. The methods 40 may be programmed via at least one hardware component (for example, a memory device, a CPU, a GPU, a TPU, a FPGA, and an ASIC) using a programming language (for example, Lisp, Smalltalk, Perl, Python, JavaScript, Ruby, C, C++, C #, Java, Haskell, ML, MATLAB, Wolfram Language, VB, VBScript, VB.NET, R, PHP, MATLAB, and other suitable programming languages) and/or processed in any operating system (for example, LINUX, unix, DOS, Windows, and other operating systems) in a computing device (for example, a desktop computer, a smart phone, a laptop, and other suitable devices). The computer hardware may include processors for building, training, storing, and/or using the ANN 30. At step 42, the methods 40 may include running multiple numerical reservoir simulations with different well locations across the reservoir to obtain reservoir properties for the purpose of training the ANN 30. For example, running the numerical reservoir simulations integrated with input data such as the geometry of a well location may generate reservoir properties of the well location. In some embodiments, the reservoir properties may include average porosity, average reservoir permeability, average reservoir thickness, initial reservoir pressure, size (for example, area) of the oil and/or gas field, average oil saturation, average water saturation, average pore volume, initial oil in place, rock compressibility, and well trajectories (for example, azimuth or length). At step 44, the methods 40 may include importing the result of step 42 for training and/or testing the ANN 30. For example, at least one of the reservoir properties may be used to determine the value(s) of the input node(s) 34 in the ANN 30. At step 46, the methods 40 may include establishing correlations between nodes in the ANN 30. For example, each node in the hidden layer(s) 26, 28 may take a weighted sum of its inputs from the node(s) 34 in the input layer 24, and pass it through a function (for example, a non-linear function) to produce its output, which becomes an input to a node in the next layer(s). By performing such procedure for all the nodes, output data in the output layer 32 (for example, the value of the output node 38) may be calculated and generated. At step 48, the methods 40 may include generating the output data (for example, possible and/or best well locations for drilling, cumulative production of the reservoir, or other data representing the well production performance). At step 52, the methods 40 may include comparing the output data with an output from at least one numerical reservoir simulation for testing and/or verifying the accuracy of the ANN 30. In some embodiments, the step 52 may include the output data associated with the best well locations for drilling, cumulative production, and/or production performance from the ANN 30. If the accuracy of the ANN 30 is lower than an accuracy above a predefined threshold, then step 54 may be required to increase the accuracy of the ANN 30. At step 54, the methods 40 may optionally include repeating steps 42 through 52 one or more times to re-run and re-train the ANN 30 as needed to achieve an accuracy above a predefined threshold (for example, at least about 80% accuracy when compared with an output from a numerical reservoir simulation). At step 56, the methods 40 may include generating the ANN 30 with an accuracy above a predefined threshold (for example, at least about 80% accuracy when compared with an output from a numerical reservoir simulation). For example, the ANN 30 with an accuracy above a predefined threshold may be stored in one or more memory devices for predicting and determining well placement, productivities, and development.

FIG. 5 illustrates methods 50 of using an ANN 30, according to aspects of the present embodiments. In some embodiments, the methods 50 may include the ANN 30 with an accuracy above a predefined threshold (for example, at least about 80% accuracy when compared with an output from a numerical reservoir simulation). At step 58, the methods 50 may include generating, either manually or automatically, one or multiple possible and/or random well locations for drilling in at least one field or reservoir, as input data. For example, the well locations in Cartesian (x,y,z) coordinates may be imported to the input node(s) 34 of the ANN 30. At step 62, the methods 50 may include running the ANN 30, optionally combined with numerical reservoir simulations, using the input data. For example, a hybrid approach that combines the ANN 30 and numerical reservoir simulations may enhance the efficiency and/or accuracy of producing the output data. At step 64, the methods 50 may include generating output data (for example, possible and/or best well locations for drilling, cumulative production of the reservoir, or other data of production performance associated with the well locations or the reservoir) from the ANN 30. At step 65, the methods 50 may include confirming the output data with numerical reservoir simulation(s). In some embodiments, step 65 may include the output data associated with the best well locations for drilling, cumulative production, and/or production performance from the ANN 30. For example, if the output data from the ANN 30 provides at least one well location with the highest production performance (for example, best cumulative production), the work crew may run numerical reservoir simulation on the well location(s) to confirm the output data and to determine whether or not to drill in proposed well location(s). At step 66, the methods 50 may optionally include drilling at least one well based on the output data. For example, work crews may generate recommended well locations with predicted well productivity metrics and confidence intervals, drill at least one well in the recommended well locations, place one or more wells in operation, compare actual well production performance with the trained ANN, and refine the ANN correlations or training modules based on the actual well production performance.

Referring still to FIGS. 4-5, in some embodiments, the methods 40 and 50 may include data for a single input and/or output parameter while in other embodiments, the methods 40 and 50 may include data for multiple input and/or output parameters. Final development plans may include the organization decision on which wells to go forward with and which wells to forego. For example, the output produced by the ANN 30 may be used in determining well locations with the best production performance to be selected and used for field development plans.

Figure 6:
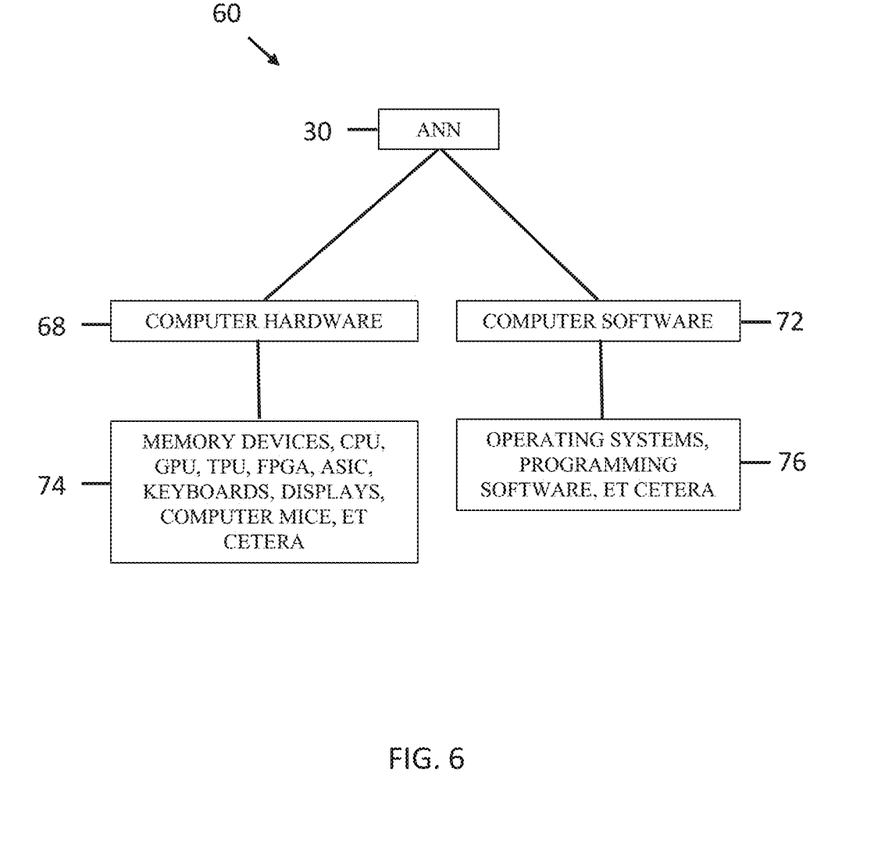
FIG. 6 illustrates an ANN system, according to aspects of the present embodiments.

FIG. 6 illustrates an ANN system 60, according to aspects of the present embodiments. The ANN system 60 may include the ANN 30, computer hardware 68, computer software 72, and other suitable devices and/or computer programs (for example, networks, servers, cloud-computing, unix terminals, supercomputers, and other computing systems distributed across multiple devices). The computer hardware 68 may be used for building, training, using and/or storing an ANN along with inputs and outputs. The computer software 72 may be used for programming and processing an ANN using the inputs and outputs. The computer hardware 68 may include one or a plurality of hardware components 74 including memory devices, a CPU, a GPU, a TPU, a FPGA, and an ASIC, keyboards, displays, computer mice, and other computer devices. The computer software 72 may include one or a plurality of software components 76 including operating systems, programming software, et cetera.

CONSTRUCTIVE EXAMPLES

The following examples are provided to illustrate, but not limit, the present disclosed embodiments.

The described approaches of an ANN work well when sufficient and comprehensive sampling of the space has been performed, but may also work in cases where there is insufficient data and/or an incomplete data set.

Example 1

The ANN 30 may use multiple forms of input data for training that may include information about geologic formations such as the presence of aquifers, the geometry and locations of fault lines, ore deposits, silts, surface erosion, surface obstructions, groundwater, oil and natural gas densities within the formation, the presence of other minerals, seismic information, electromagnetic properties of the formation, and other properties and input parameters. Once the model is sufficiently trained, several locations within the formation may be tested using test cases run through the ANN 30. The outputs from the ANN 30 (for example, outputs predicting the most favorable locations from a production point of view) may be confirmed against collected data and other simulation models. Once adequate confidence has been established in the ANN, the confirmed outputs (as well as others that are not possible to confirm due to insufficient collected data and/or insufficient modeling and simulation) may then be used in decision making relating to the final development plans (for example, the number and locations of wells to drill within the geologic formation).

The approaches and examples described herein are examples of practical implementations of the developed ANN methodologies in specific cases related to geophysical applications.

All or part of the system and processes described in this specification and their various modifications (subsequently referred to as "the processes") may be controlled at least in part by one or more computing systems using one or more computer programs. Examples of computing systems include, either alone or in combination, one or more desktop computers, laptop computers, servers, server farms, and mobile computing devices such as smartphones, feature phones, and tablet computers.

The computer programs may be tangibly embodied in one or more information carriers, such as in one or more non-transitory machine-readable storage media. A computer program can be written in any form of programming language, including compiled or interpreted languages, and it can be deployed as a stand-alone program or as a module, part, subroutine, or unit suitable for use in a computing environment. A computer program can be deployed to be executed on one computer system or on multiple computer systems at one site or distributed across multiple sites and interconnected by a network.

Actions associated with implementing the systems may be performed by one or more programmable processors executing one or more computer programs. All or part of the systems may be implemented as special purpose logic circuitry, for example, a field programmable gate array (FPGA) or an application-specific integrated circuit (ASIC), or both. All or part of the systems may also be implemented as special purpose logic circuitry, for example, a specially designed (or configured) central processing unit (CPU), a graphics processing unit (GPU), and/or a tensor processing unit (TPU).

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media.

Non-transitory machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks such as internal hard disks or removable disks, magneto-optical disks, CD-ROMs (compact disk-read only memory) and DVD (digital versatile disk) ROM.

Each computing device may include a hard drive for storing data and computer programs, one or more processing devices (for example, a microprocessor), and memory (for example, RAM) for executing computer programs. Each computing device may include an image capture device, such as a still camera or video camera. The image capture device may be built-in or simply accessible to the computing device.

Each computing device may include a graphics system, including a display screen. A display screen, such as a liquid crystal display (LCD) or a CRT (Cathode Ray Tube) displays to a user images that are generated by the graphics system of the computing device. One or more displays or images on a computer display (for example, a monitor) physically transforms the computer display. For example, if the computer display is LCD-based, the orientation of liquid crystals may be changed by the application of biasing voltages in a physical transformation that is visually apparent to the user. As another example, if the computer display is a CRT, the state of a fluorescent screen may be changed by the impact of electrons in a physical transformation that is also visually apparent. Each display screen may be touch sensitive, allowing a user to enter information onto the display screen via a virtual keyboard. On some computing devices, such as a desktop computer or a smartphone, a physical QWERTY keyboard or Arabic keyboard and scroll wheel may be provided for entering information onto the display screen.

Each computing device, and computer programs executed on each computing device, may also be configured to accept voice commands, and may be configured to perform functions in response to such commands. For example, the process described in this specification may be initiated at a client, to the extent possible, via voice commands.

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

These and other features, aspects and advantages of the present invention will become better understood with reference to the following description and appended claims. The accompanying drawings, which are incorporated in and constitute a part of this specification, illustrate embodiments of the present disclosure and, together with the description, serve to explain the principles of the present embodiments.

CERTAIN DEFINITIONS

In order for the present disclosure to be more readily understood, certain terms are first defined below. Additional definitions for the following terms and other terms are set forth throughout the specification.

As used herein, the terms "neural network" and "correlation matrix" may be used interchangeably and may refer to systems and methods that relate at least one input parameter to at least one output parameter of a system, and quantify such relationships between input and output parameters. Neural networks and correlation matrices may be built autonomously via one or more computer-implemented systems, and may also be built in connection with one or more human inputs.

As used herein, the terms "artificial neural network", "ANN", "ANN model", "machine-learning", "artificial intelligence," "cognitive reasoning," "autonomous systems," "adaptive algorithms," "deep learning," and "heuristics" may all describe systems, methods, protocols, and apparatuses that search for and establish correlations that are at partially predictive of at least one output or result, at least some percent of the time, without requiring previous programming or instruction for every executable step, and without needing to be 100% predictive in every situation.

As used herein, the term "computer" and "computing device" may be used to describe electronic devices that receive inputs, process the inputs, calculate results from the inputs, and generate outputs. Examples include desktop computers, smart phones, tablets, laptops, and other suitable devices.

As used herein, the term "reservoir" may be used to describe a subsurface body of rock having sufficient porosity and permeability to store and transmit fluids.

As used herein, the term "well" may be used to describe a hole drilled in the subsurface to reach a reservoir.

As used herein, the term "field" may be used to describe an accumulation, pool or group of pools of oil or gas in the subsurface. A field may consist of a reservoir.

As used herein, the term "well placement" may be used to describe activities associated with drilling in a wellbore to intercept one or more specified locations.

As used herein, the term "recovery factor" and "RF" may be used to describe the proportion of the hydrocarbon that can be recovered. The correlation to estimate the recoverable oil or gas in a reservoir is: Recoverable oil or gas in place=OHIP×RF where: OHIP=original hydrocarbons in place.

As used herein, the term "well production" may be used to describe the operation of producing oil and/or gas from a reservoir or a well.

As used herein, the term "well productivity" and "well production performance" may be used to describe the capability and effectiveness of a reservoir or a well to produce oil and/or gas.

As used herein, the term "cumulative production" may refer to the total amount of oil and/or gas produced from a reservoir over a particular period of time in the life of a reservoir.

As used herein, the term "accuracy" may refer to the amount of the final output(s) that match the numerical simulation with a predetermined tolerance or uncertainty threshold.

As used herein, the term "substantially" refers to the qualitative condition of exhibiting total or near-total extent or degree of a characteristic or property of interest.

As used herein, "a" or "an" with reference to a claim feature means "one or more," or "at least one."

EQUIVALENTS

It is to be understood that while the disclosure has been described in conjunction with the detailed description thereof, the foregoing description is intended to illustrate and not limit the scope of the invention(s). Other aspects, advantages, and modifications are within the scope of the claims.

This written description uses examples to disclose the invention, including the best mode, and also to enable any person skilled in the art to practice the present embodiments, including making and using any devices or systems and performing any incorporated methods. The patentable scope of the present embodiments is defined by the claims, and may include other examples that occur to those skilled in the art.

What is claimed is:

1. An system comprising:
    an artificial neural network (ANN), wherein the ANN comprises an input layer of input nodes representing at least one input parameter, an output layer of output nodes representing a plurality of output parameters, and at least one hidden layer operatively coupling the input layer to the output layer;
    a numerical reservoir simulator;
    computer hardware and computer software for building, training, using, and storing the ANN; and
    a computer processor configured to:
        receive the at least one input parameter;
        process the at least one input parameter with the ANN to produce the plurality of output parameters, wherein the plurality of output parameters comprises a well coordinate for a new well in a reservoir a cumulative production of the reservoir, and a production performance of the new well;
        process the well coordinate for the new well with the numerical reservoir simulator,
    wherein if the numerical reservoir simulator confirms the production performance of the new well, a well is drilled according to the well coordinate of the new well.

2. The system of claim 1, wherein the at least one input parameter comprises at least one reservoir property.

3. The system of claim 2, wherein the at least one reservoir property comprises at least one of an average porosity, an average reservoir permeability, an average reservoir thickness, an initial reservoir pressure, a size of a field, an average oil saturation, an average water saturation, an average pore volume, an initial oil in place, a rock compressibility, and well trajectories.

4. The system of claim 2, wherein the at least one reservoir property is generated by running numerical reservoir simulations with the numerical reservoir simulator.

5. The system of claim 4, wherein running numerical reservoir simulations comprises:
    importing input parameters;
    running one or more scenarios through numerical reservoir simulations; and
    generating outputs.

6. The system of claim 1, wherein the computer hardware comprises a memory device.

7. The system of claim 1, wherein the computer hardware comprises at least one of a graphics processing unit (GPU), a tensor processing unit (TPU), a field-programmable gate array (FPGA), and an application-specific integrated circuit (ASIC).

8. The system of claim 1, wherein the computer software comprises an operating system and a programming language.

9. The system of claim 8, wherein the programming language comprises at least one of Lisp, Smalltalk, Perl, Python, JavaScript, Ruby, C, C++, C #, Java, Haskell, ML, MATLAB, Wolfram Language, VB, VBScript, VB.NET, R, PHP, and MATLAB.

10. The system of claim 1, wherein the well drilled according to the well coordinate of the new well is a horizontal well.

11. The system of claim 1, wherein the well drilled according to the well coordinate of the new well is a non-horizontal well.

12. The system of claim 1, wherein the ANN comprises a correlation that describes fluid flow in at least one porous media of the reservoir, wherein the correlation is linear.

13. The system of claim 1, wherein the ANN comprises a correlation that describes fluid flow in at least one porous media of the reservoir, wherein the correlation is non-linear.

14. The system of claim 1, wherein the ANN achieves at least 80% accuracy when compared with an output from a numerical reservoir simulation.

15. A method comprising:
- generating input data, wherein the input data comprises at least one reservoir property simulated with a numerical reservoir simulator or collected from an existing plurality of wells;
- generating, with a trained artificial neural network operating on the input data, output data, wherein the output data comprises a well coordinate for a new well in a reservoir, a production performance of the new well, and a cumulative production of the reservoir;
- determining, with the numerical reservoir simulator, the numerical production performance of the new well with a simulation based on the well coordinate of the new well; and
- drilling the new well based on the well coordinate if the numerical production performance confirms the production performance.

16. The method of claim 15, further comprising:
- determining, with the numerical reservoir simulator, if the new well has the highest production performance.

* * * * *